United States Patent [19]

Miyamoto

[11] Patent Number: 4,619,521

[45] Date of Patent: Oct. 28, 1986

[54] IMAGE PROCESSING APPARATUS

[75] Inventor: Kazuki Miyamoto, Yokohama, Japan

[73] Assignee: Canon Kabushiki Kaisha, Tokyo, Japan

[21] Appl. No.: 715,416

[22] Filed: Mar. 25, 1985

[30] Foreign Application Priority Data

Mar. 31, 1984 [JP] Japan .................................. 59-62231
Mar. 31, 1984 [JP] Japan .................................. 59-62232

[51] Int. Cl.[4] ........................ G03G 15/00; G03B 27/52

[52] U.S. Cl. ...................................... 355/14 R; 355/55

[58] Field of Search ...................... 355/55, 14 R, 14 C, 355/60

[56] References Cited

U.S. PATENT DOCUMENTS 3,792,926 2/1974 Knechtel et al. ................. 355/60 X
4,327,994 5/1982 Barley et al. ..................... 355/14 R
4,361,395 11/1982 Washio et al. ................ 355/14 C X
4,505,579 3/1985 Furuichi ....................... 355/14 R X

*Primary Examiner*—L. T. Hix
*Assistant Examiner*—Della Rutledge
*Attorney, Agent, or Firm*—Fitzpatrick, Cella, Harper & Scinto

[57] ABSTRACT

An image processing apparatus such as a copying machine has ten keys for inputting the length of an original image and a desired length of a reproduced image a control section including an arithmetic unit for calculating the magnification based on the data input by the ten keys, a display for displaying each length data and the calculated magnification, and a memory for storing the calculated magnification. The machine can automatically calculate a suitable magnification based on input data and can store the calculated magnification for continuous copying operation.

19 Claims, 7 Drawing Figures

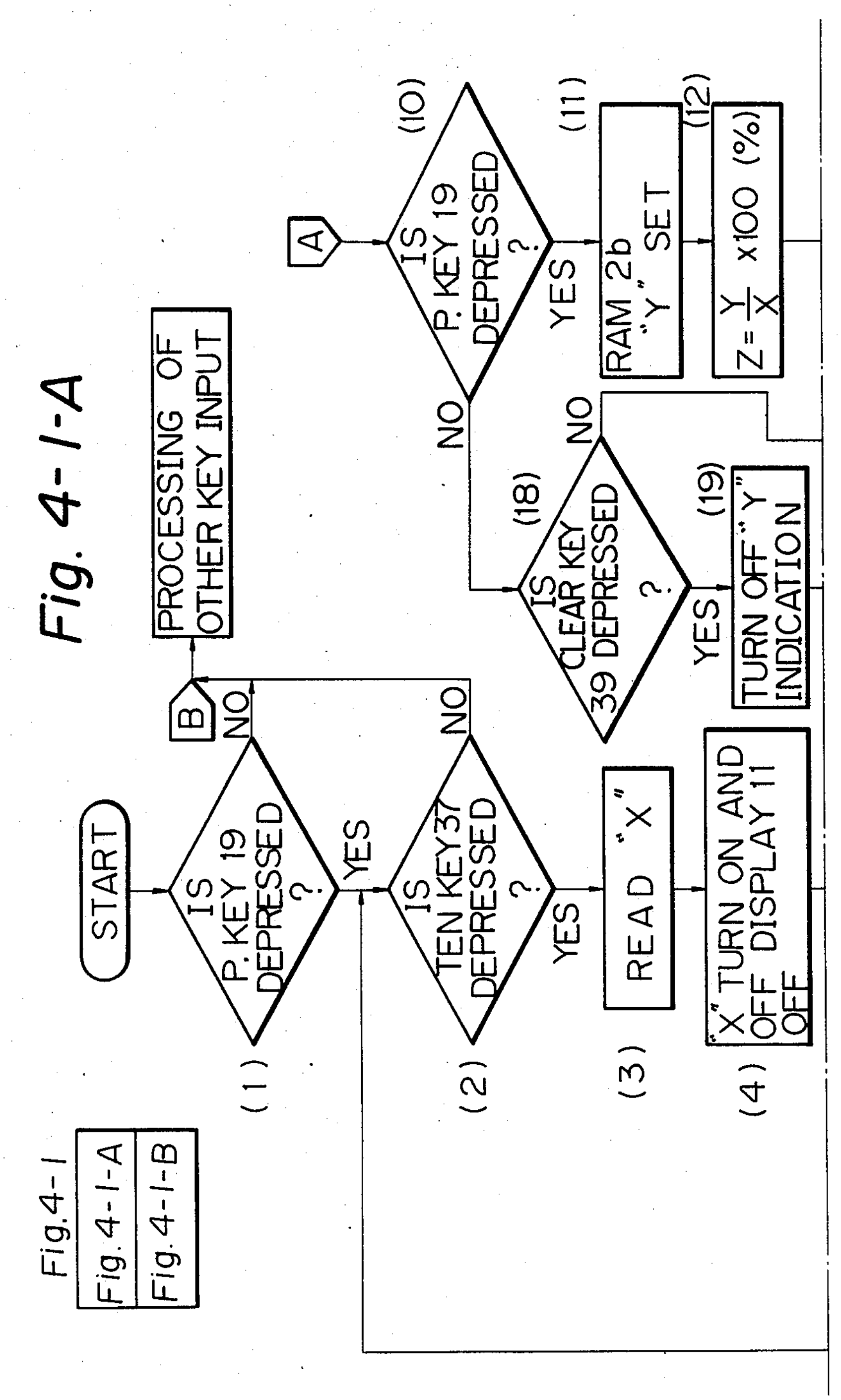
Fig. 4-1-A

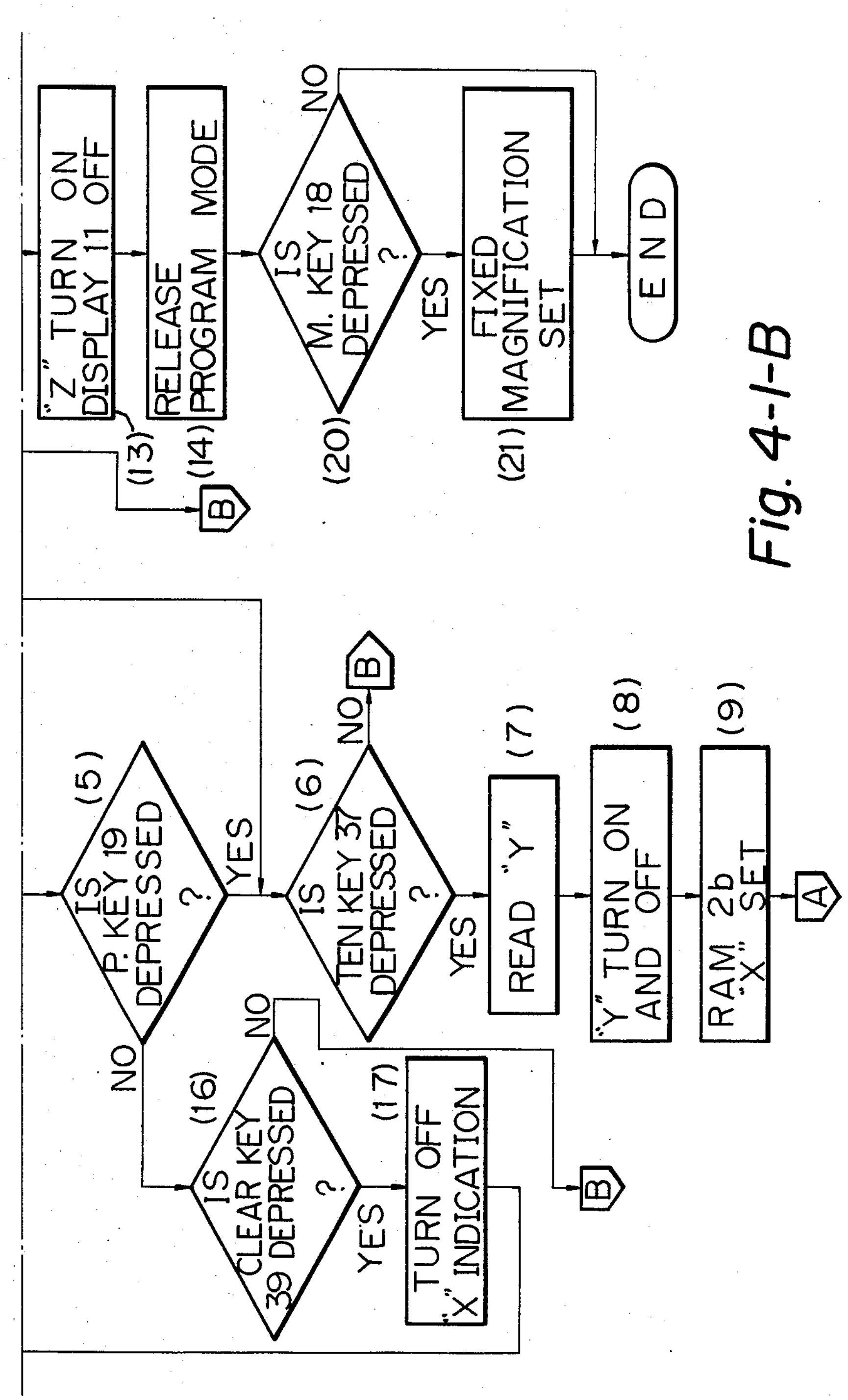
Fig. 4-1-B

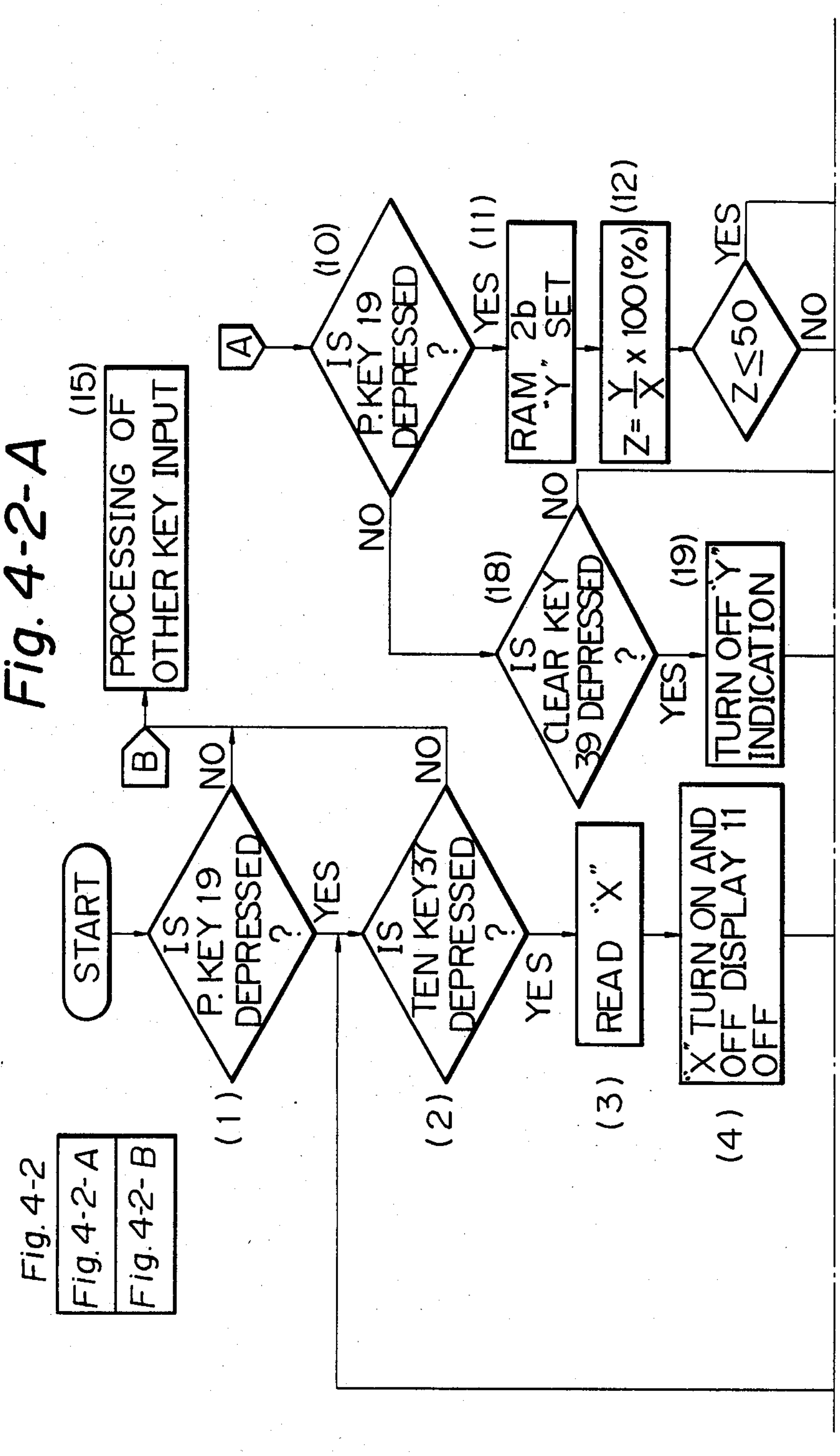
Fig. 4-2-A

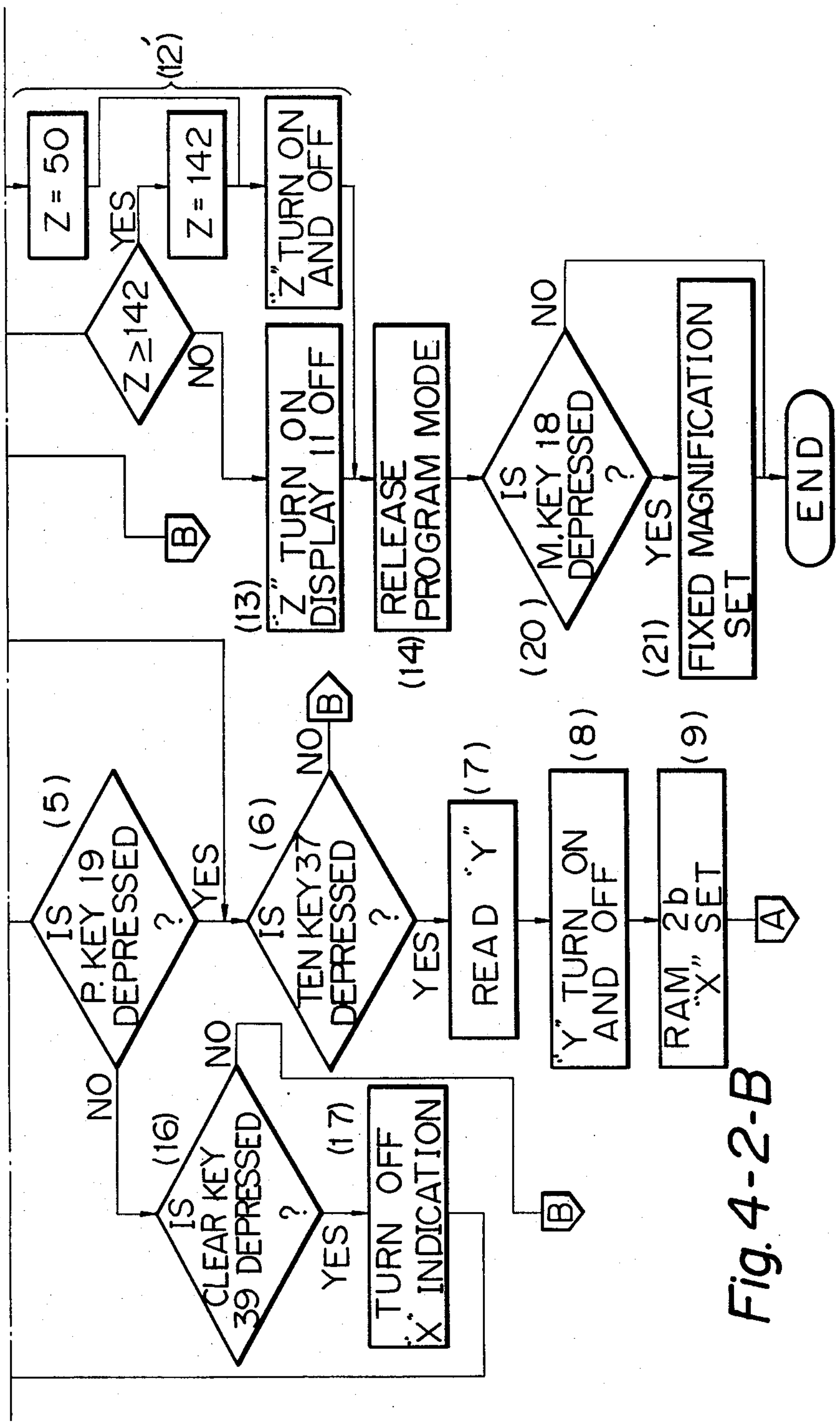
Fig. 4-2-B

IMAGE PROCESSING APPARATUS

BACKGROUND OF THE INVENTION

1. Field of the Invention

The present invention relates to an image processing apparatus such as a copying machine which is capable of arbitrarily setting an image magnification.

2. Description of the Prior Art

In some image processing apparatuses such as copying machines, image magnifications can be set in the stepless manner. In such apparatuses, ten keys or a control volume are/is used to set an image magnification in a stepless manner.

However, the user must determine a desired magnification based on the length of an original and the length of copy sheets used. Otherwise, the user must calculate a desired magnification in accordance with the original size of a character, symbol, figure or an illustration on an original and the length of an image to be formed on a copy sheet. Then, the user must set this magnification using the ten keys or control volume. When characters or symbols of different sizes must be reproduced with the same size, a corresponding number of magnification must be set and the operator must remember all these magnifications before setting them. This slows down the copying operation.

SUMMARY OF THE INVENTION

The present invention has been made in consideration of this and has its object to provide an image processing apparatus with an improved operability.

It is another object of the present invention to provide an image processing apparatus which allows easy setting of an image magnification.

It is still another object of the present invention to provide an image processing apparatus which is capable of forming images at different magnifications without requiring a complex operation by the operator.

It is still another object of the present invention to provide an image processing apparatus which is capable of automatically setting an image magnification when the length of an original image such as a character or a symbol on an original and the length of an image to be formed on a copy sheet are entered by keys.

It is still another object of the present invention to provide an image processing apparatus which is capable of registering an automatically set magnification.

The above and other objects and features of the present invention will be described below.

BRIEF DESCRIPTION OF THE DRAWINGS

FIGS. 4-1 and 4-2 are flow charts showing the control sequence according to the present invention; and FIGS. 5-1 and 5-2 are representations showing the display states.

DETAILED DESCRIPTION OF THE PREFERRED EMBODIMENTS

The preferred embodiment of the present invention will be described in detail below.

Figure 1:
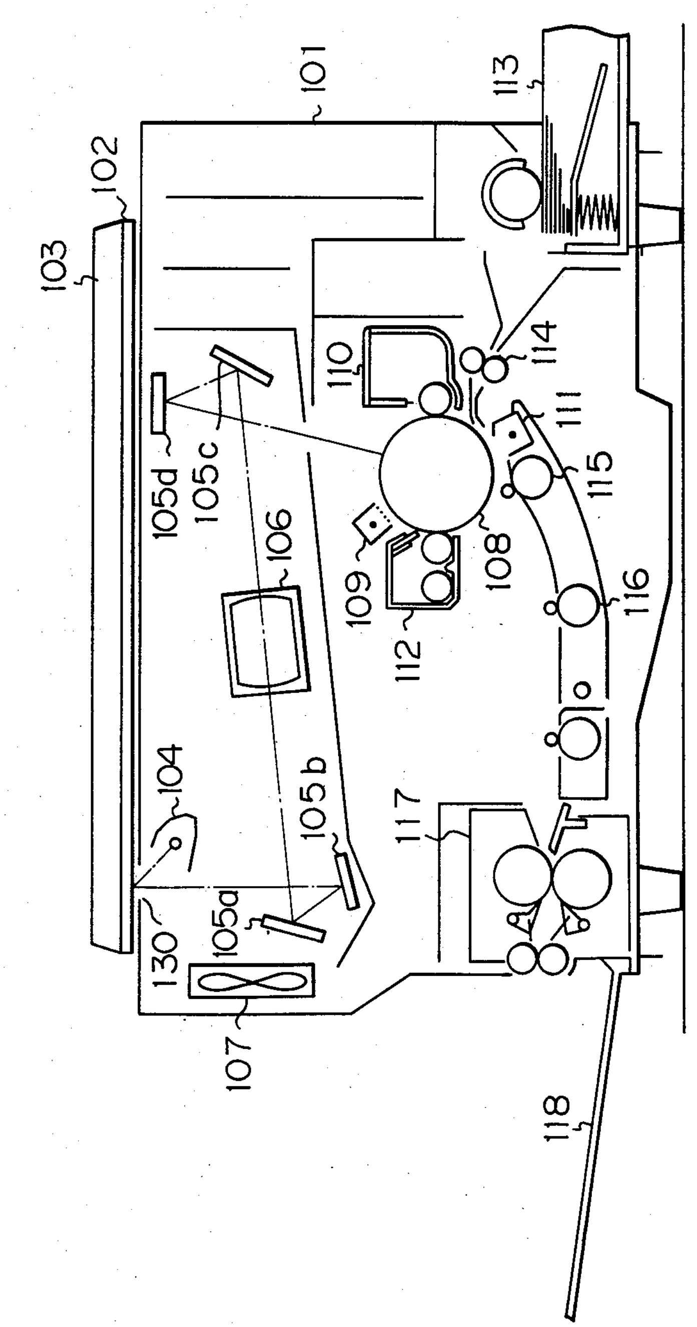
FIG. 1 is a sectional view showing the schematic configuration of a copying machine to which the present invention can be applied.

FIG. 1 is a sectional view of a copying machine to which the present invention can be applied. Referring to FIG. 1, a platen 102 for placing an original thereon is arranged at the upper portion of a copying machine main body 101. An original table cover 103 covers the original plated on the platen 102. An original exposure lamp 104 exposes the original placed on the platen 102. Reflecting mirrors 105*a* to 105*d* guide light reflected by the original toward a photosensitive drum 108. A zoom lens 106 is used for forming an image of the original at a different magnification. A cooling fan 107 is arranged at the left side of the copying machine main body 101. A charger 109 is for uniformly charging the photosensitive drum 108 positively or negatively. A developing unit 110 visualizes an electrostatic latent image formed on the drum 108 with toner. A transfer charger 111 transfers the toner image on the drum 108 onto a transfer sheet. A cleaner 112 removes any residual toner on the drum 108 after the image transfer. A cassette 113 stores transfer sheets. Register rollers 114 are for synchronizing the leading edge of the image and the leading edge of the transfer sheet. Convey rollers 115 and 116 are for conveying the transfer sheet. A fixing unit 117 is for fixing the toner image transferred on the transfer sheet. An exhaust tray 118 is for receiving the transfer sheet having the image fixed thereon.

When a copy start key on the operation panel to be described later is depressed, the platen 102 and the original table cover 103 are moved together. The original on the platen 102 is exposed to the light from the original exposure lamp 104 when it passes over a slit exposure unit 130. Light reflected from the original exposes the drum 108 through the reflecting mirrors 105*a* to 105*d* and the zoom lens 106. The photosensitive drum 108 has been charged positively or negatively by the charger 109 and an electrostatic latent image corresponding to original image is formed on the drum 108 by this exposure operation. The latent image on the drum 108 is visualized into a toner image by the developing unit 110. The toner image is transferred onto a transfer sheet which is fed from the cassette 113 through the register rollers 114 at a predetermined timing. The image is fixed by the fixing unit 117 and is exhausted onto the tray 118.

In this embodiment, in addition to the predetermined copying magnifications, an arbitrary magnification can be set in a stepless manner.

Figure 2:
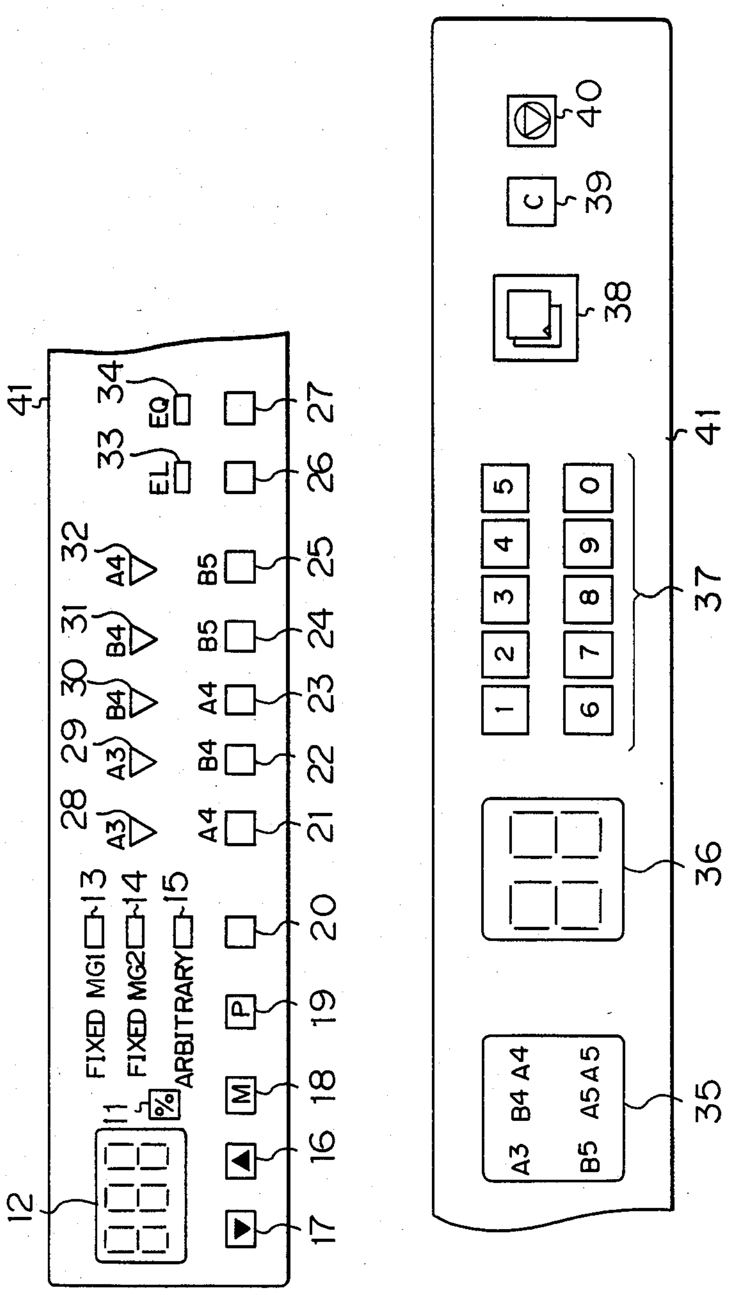
FIG. 2 is a plan view showing an operation panel.

FIG. 2 is a front view of the operation panel of the copying machine shown in FIG. 1. A displays an image magnification (%). LEDs 13 and 14 indicated that corresponding fixed magnifications 1 and 2 are selected. An LED 15 indicates that the magnification displayed by the indicator 12 is an arbitrary magnification. An up key 16 is for performing an "up" operation (increasing) of the magnification displayed by the indicator 12. A down key 17 is for performing a "down" operation (decreasing) of the magnification displayed by the indicator 12. A memory key (to be referred to as an M key herinafter) 18 is for sending a storage instruction for storing the magnification as the fixed magnification 1 or 2 in a memory to be described later. A magnification set key (to be referred to as a P key herinafter) 19 is for inputting an input instruction of length data or an arithmetic instruction of a magnification. When the P key 19 is depressed, the copying machine is set in the program mode. A magnification selection key 20 is used to select one of the fixed magnifications 1 and 2 or the arbitrary magnification mode. Fixed magnification selection keys 21 to 27 are used to select a fixed magnification. LEDs 28 to 34 are for indicating the selected fixed magnification. An LED 35 is for indicating the cassette size. A number display 36 is for displaying the set copy number and copied number. Then keys 37 are used for inputting the set copy number and an image length. An operation panel main body 41 further has a copy start key 38, a clear key 39, and a stop key 40.

Figure 3:
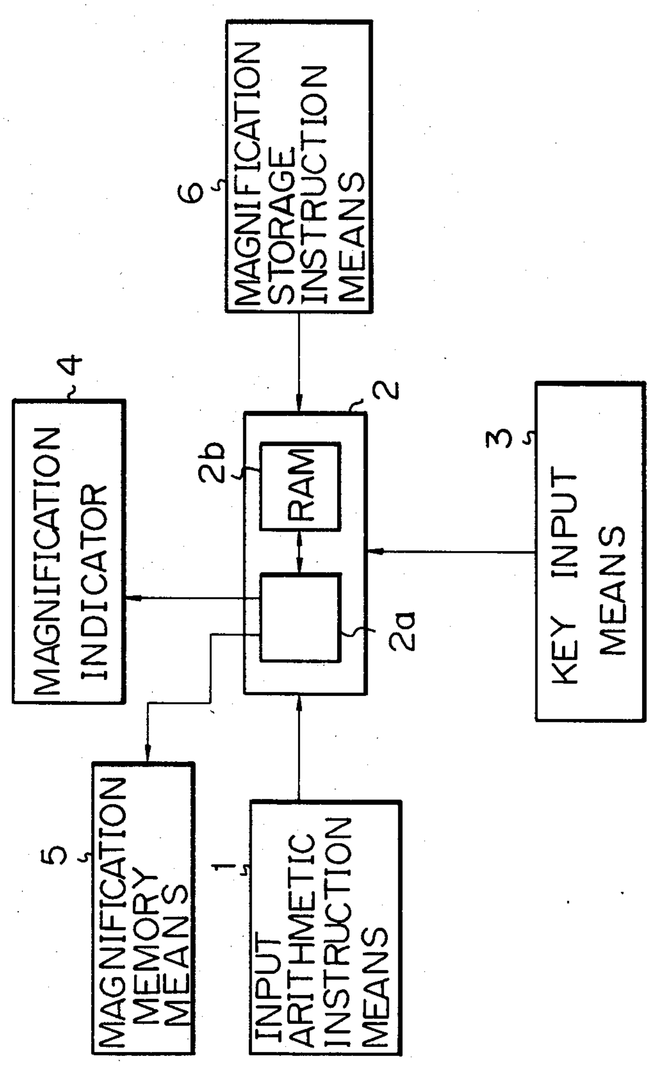
FIG. 3 is a block diagram showing the schematic configuration of a control section.

FIG. 3 is a block diagram showing the schematic configuration of the control section. An input arithmetic instruction means 1 is for instructing an operation of an image magnification or inputting length data. The display 11 includes the P key 19 shown in FIG. 2. A main control section 2 comprises, for example, a microprocessor and includes a magnification operating means 2*a*, RAM 2*b* and the like. A key input means 3 includes the ten keys 37 and the like. A magnification indicator 12 indicates the magnification calculated by the magnification operating means 2*a* based on the length data input from the key input means 3 and the operation instruction received from the input arithmetic instruction means 1 after the input instruction therefrom. A magnification memory means 5 stores the magnification calculated by the magnification operating means 2*a*. A magnification storage instruction in the magnification memory means 5. The means 6 includes the M key 18 shown in FIG. 2.

The mode of operation of this embodiment will be described below.

First, the operator operates the input arithmetic instruction means 1 so as to instruct the main control section 2 to receive the numerical data input from the key input means such as ten keys as length data. Then, the main control section 2 receives the initial length data (e.g., original image length) from the key input means 3. In order to receive the next length data, the main control section 2 stores the initial length data in the RAM 2*b* and also displays the length data (original image length) at the magnification indicator 12. When the operator supplies another input instruction from the input arithmetic instruction means 1 to the main control section 2, the next length data (reproduced image length) from the key input means 3 is received by the main control section 2. The main control section 2 stores the received length data (reproduced image length) in the RAM 2*b* and also indicates it at the magnification indicator 12. When the operator then supplies an arithmetic instruction to the main control section 2 from the input arithmetic instruction means 1, the magnification operating means 2*a* reads out the two length data stored in the RAM 2*b*, calculates the magnification based on the readout data, and indicates the calculated magnification at the indicator 12. When the operator supplies a storage instruction of the calculated magnification from the magnification storage instruction means 6, the main control section 2 stores the magnification indicated at the indicator 12 into the magnification memory means 5. The magnification memory means 5 can be incorporated at a designated address of the RAM 2*b*.

The control sequence of the copying machine in the program mode (magnification setting mode based on the length data) will be described with reference to the flow chart shown in FIG. 4-1. Note that numerals in parentheses (1) to (21) denote steps in FIG. 4-1 and the following description.

The main control section 2 waits for depression of the P key 19 (1). When the P key 19 is depressed, the LED 15 for indicating the arbitrary magnification is turned on and off. The main control section 2 waits for depression of the ten keys 37 (2). When the ten keys 37 are depressed, numeral input from the ten keys 37 is read in as original length data X (3). The data X is indicated at the indicator 12 and the "%" display 11 is turned off (4). As in steps (1) and (2), depression of the P key 19 and the ten keys 37 is awaited (5), (6). When both the keys are depressed, numeral input from the ten keys 37 are read in as reproduced image length data Y (7). The data Y is displayed at the indicator 12 (8). The data X read in in step (3) is stored in the designated address of the RAM 2*b* (9). Depression of the P key 19 is awaited (10). When the P key 19 is depressed, the length data Y read in in step (7) is stored in the designated address of the RAM 2*b* (11). Subsequently, an arithmetic operation magnification $Z=Y/X\times 100$ (%) is performed (12). The magnification Z calculated in step (12) is displayed at the indicator 12 (13), and the program mode is released (14). Depression of the M key 18 is checked (20). When the M key 18 is depressed, the magnification calculated in step (12) is stored as the fixed magnification 1 or 2 (21). If the M key 18 is not depressed, the control sequence is stopped. If NO in step (1), (2) or (6), the flow advances to step (15) and other key input operation is performed. If NO in step (5), depression of the clear key 39 is checked (16). If YES in step (16), the length data X displayed in step (4) is turned off and the flow returns to step (2), (17). However, if NO in step (16), the flow returns to step (15). Similarly, if NO in step (10), depression of the clear key 39 is checked (18). If YES in step (10), the length data X displayed in step (8) is turned off and the flow returns to step (6). However, if NO in step (10), the flow returns to step (15).

Referring to the display states shown in FIGS. 5-1 and 5-2 ((*a*) to (*e*)), an example of display will be described with reference to a case wherein the keys are depressed in the order of the P key 19, keys "2" and "8" among the ten keys 37, the P key 19, keys "2" and "5" among the ten keys 37, and the P key 19.

Figures 1, 5:
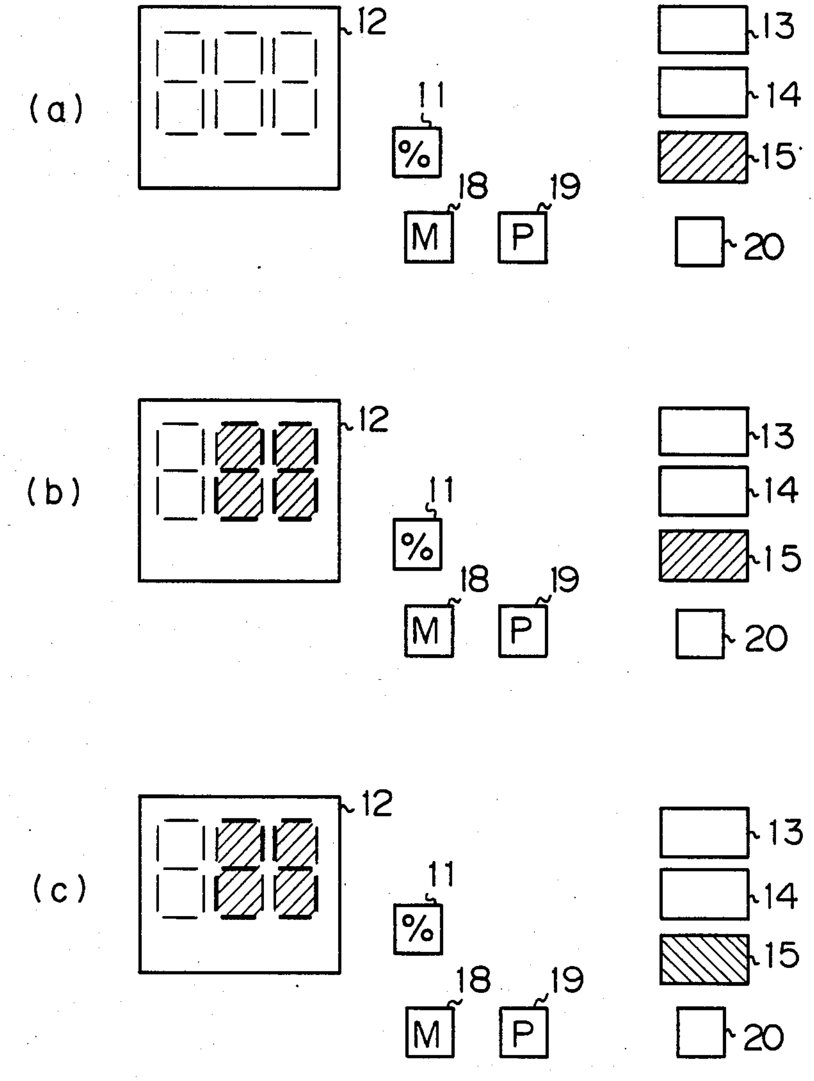
Figures 1, 5:
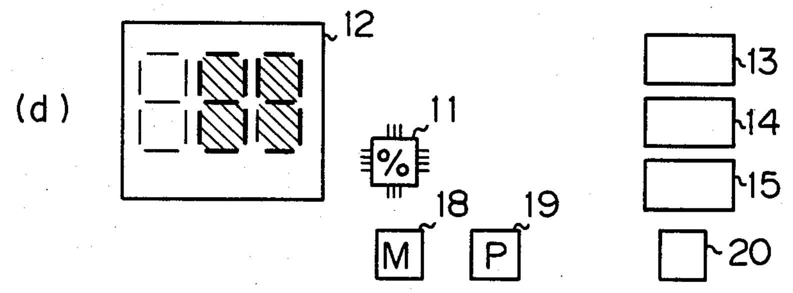
Figures 2, 5:
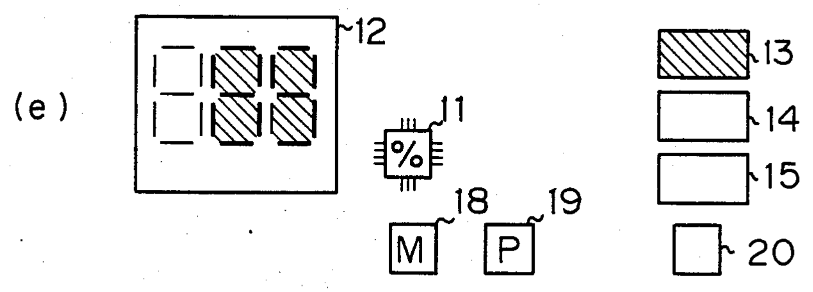

FIG. 5-1(*a*) shows a state after the P key 19 is depressed for the first time. In this state, the magnification indicator 12 and the "%" display 11 are OFF and the LED 15 for displaying an arbitrary magnification is turned on and off (hatched). FIG. 5-1(*b*) shows a state wherein the ten keys 37 are depressed and "28" is indicated on the magnification indicator 12. FIG. 5-1(*c*) shows a state wherein the P key 19 is depressed for the second time, the keys "2" and "5" of the ten keys 37 are depressed, and "25" is indicated on the magnification indicator 12. FIG. 5-1(*d*) shows a state wherein the P key 19 is depressed for the third time, the arithmetic operation $Z\ (\%)=Y/X\times 100=25/28\times 100=89.28\simeq 89$ (%) is performed (fractions below the decimal point are rounded to provide 89 %), and "89" is indicated on the magnification indicator 12 (cross hatched). At the same time as this display, the LED 15 is changed from the turn ON/OFF state to the ON state. FIG. 5-2(*e*) stores a state wherein the M key 18 is depressed to store the displayed magnification 89% in FIG. 502(*d*) as the fixed magnification 1 and the LED 13 is turned on. At this time, "89" is displayed at the magnification indicator 12. The magnification can be set in a stepless manner, i.e., in units of % within the range of 50% to 142%. The length data X and Y can be set in the range of 0 to 999 mm. However, data "0" is not set for the length data X.

The following alternative operation can be performed. When the magnification X obtained by calculating based on the length data X and Y falls outside the range of 50% to 142%, e.g., when the magnification Z is 48%, 50% is indicated at the magnification indicator 12. When the copy start key 38 is depressed in this state, an image is reproduced at the magnification of 50%. Similarly, when the calculated magnification Z is 150%, 142% is indicated at the magnification indicator 12. When the copy start key 38 is depressed in this state, an image is reproduced at the magnification of 142%. FIG. 4-2 shows the flow chart for performing this operation. The flow is the same as that in FIG. 4-1 except for step (12').

After the magnification Z is calculated in step (12) as described with reference to FIG. 4-1, it is checked in step (12') if the magnification Z is 50% or less or 142% or more. If the magnification is 50% or more, 50% is set as Z. If the magnification is 142% or more, 142% is set as Z. "50" or "142" is turned ON or OFF and the flow advances to step (14).

Thus, an indication is made to the operator that the input magnification falls outside the predetermined range.

The above embodiment has been described with reference to the case wherein a general copying machine adopting the electrophotographic method is used as an image processing apparatus. However, the present invention can be similarly applied to an ink-jet printer or the like.

What I claim is:

1. An image processing apparatus comprising:
output means for outputting data corresponding to an original image length;
key input means for manually setting data corresponding to a desired reproducing image length;
arithmetic means for calculating a magnification based on the data output by said output means and the data set by said key input means; and
display means for displaying the magnification calculated by said arithmetic means.

2. An apparatus according to claim 1, wherein said output means has key input means for setting data corresponding to the original image length.

3. An apparatus according to claim 2, wherein said key input means for setting the data corresponding to the original image length and said key input means for setting the data corresponding to the desired reproducing image length are common.

4. An apparatus according to claim 3, wherein said key input means are capable of inputting the data and the number of images to be formed.

5. An image processing apparatus comprising:
output means for outputting data corresponding to an original image length;
key input means for manually setting data corresponding to a desired reproducing image length;
arithmetic means for calculating a magnification based on the data output from said output means and the data set by said key input means; and
memory means for storing the magnification calculated by said arithmetic means.

6. An apparatus according to claim 5, wherein said output means has key input means for setting the data corresponding to the original image length.

7. An apparatus according to claim 6, wherein said key input means for setting data corresponding to the original image length and said key input means for setting the data corresponding to the desired reproducing image length are common.

8. An apparatus according to claim 7, wherein said key input means are capable of inputting the data and the number of images to be formed.

9. An image processing apparatus comprising:
key input means for setting first data corresponding to an original image length;
output means for outputting second data corresponding to a reproducing image length;
arithmetic means for calculating a magnification in accordance with the first and second data; and
registration means for registering the magnification calculated by said arithmetic means such that the magnification is reusable.

10. An apparauts according to claim 9, wherein said output means has key input means for setting the second data corresponding to the reproducing image length.

11. An apparatus according to claim 10, wherein said key input means for setting the first data corresponding to the original image length and said key input means for setting the second data corresponding to the reproducing image length are common.

12. An apparatus according to claim 11, wherein said key input means is capable of inputting the first and second data and the number of images to be formed.

13. An image processing apparatus comprising:
output means for outputting first data corresponding to an original image length;
key input means for setting second data corresponding to a reproducing image length;
arithmetic means for calculating a magnification in accordance with the first and second data; and
registration means for registering the magnification calculated by said arithmetic means such that the magnification is reusable.

14. An apparatus according to claim 13, wherein said output means has key input means for setting the first data corresponding to the original image length.

15. An apparatus according to claim 14, wherein said key input means for setting the first data corresponding to the original image length and said key input means for setting the second data corresponding to the reproducing image length are common.

16. An apparatus according to claim 15, wherein said key input means are capable of inputting the first and second data and the number of images to be formed.

17. An apparatus according to claim 1, wherein said key input means is adapted to enter said input data as numerical data.

18. An apparatus according to claim 5, wherein said key input means is adapted to enter said input data as numerical data.

19. An apparatus according to claim 13, wherein said key input means is adapted to enter said input data as numerical data.

* * * * *

Notice of Adverse Decision in Interference

In Interference No. 101,890, involving Patent No. 4,619,521, K. Miyamoto, IMAGE PROCESSING APPARATUS, final judgment adverse to the patentee was rendered May 12, 1989, as to claims 1-19.

[*Official Gazette September 19, 1989.*]